United States Patent [19]
Harris et al.

[11] 3,915,646
[45] Oct. 28, 1975

[54] METHOD AND MEANS FOR QUANTITATIVE ANALYSIS OF SULFURIC ACID-CONTAINING GASES

[75] Inventors: Bernard Harris, Tewksbury, Mass.; Lorenzo Willard Richards, Thousand Oaks, Calif.

[73] Assignee: Cabot Corporation, Boston, Mass.

[22] Filed: Sept. 30, 1974

[21] Appl. No.: 510,179

[52] U.S. Cl. .................. 23/232 E; 23/254 E; 73/26
[51] Int. Cl.[2] ..................... G01N 1/22; G01N 31/06; G01N 27/06
[58] Field of Search .......... 23/232 E, 232 R, 254 E, 23/254 R, 255 R, 255 E; 73/23, 26, 27

[56] References Cited
UNITED STATES PATENTS

| | | |
|---|---|---|
| 2,953,441 | 9/1960 | Clauss ............................... 23/232 E |
| 3,367,747 | 2/1968 | Sieth et al. ......................... 23/254 R |
| 3,698,159 | 10/1972 | Ruse ................................. 23/254 E |

*Primary Examiner*—R. E. Serwin
*Attorney, Agent, or Firm*—Jack Schuman; Barry R. Blaker; Lawrence A. Chaletsky

[57] ABSTRACT

There is disclosed a method and means for the quantitative analysis of sulfuric acid contained as a vapor or aerosol in a sample gas. The sample gas is contacted with a water extractant having a substantial exposed surface, thereby to collect the sulfuric acid component therein. The resulting water/sulfuric acid solution is diluted with a further amount of water and the electrical conductivity of the resulting liquid aliquot is measured, said conductivity being related to the concentration of sulfuric aicd therein.

9 Claims, 2 Drawing Figures

METHOD AND MEANS FOR QUANTITATIVE ANALYSIS OF SULFURIC ACID-CONTAINING GASES

BACKGROUND OF THE INVENTION

The present invention relates broadly to quantitative analysis of gas samples and is more particularly concerned with method and means for the quantitative analysis of sulfuric acid entrained as an aerosol or vapor in a sample gas.

In recent years acute attention is being paid to the presence of pollutants in the atmosphere and to the environmental, ecological and health effects thereof. One known atmospheric pollutant whose deleterious effects are as yet incompletely understood is sulfuric acid. Heretofore, atmospheric sulfuric acid pollution, either in vapor or aerosol form, has generally been conceded to find its principal source in the plethora of home and industrial combustion reactions involving the burning of sulfur-bearing fuels. Such combustion reactions generally yield both $SO_3$ and $SO_2$ as by-products. Sulfur trioxide can react directly with atmospheric moisture to produce sulfuric acid pollutant. However, the concentrations of sulfuric acid found in the environment are often greater than can be explained simply by the direct conversion of $SO_3$ produced by burning of fossil fuels to sulfuric acid. Accordingly, there has been further demonstrated the probability that the sulfur dioxide by-product of combustion reactions can be photooxidized under the influence of sunlight to sulfur trioxide which, of course, then reacts with atmospheric moisture in the manner outlined above to form further amounts of sulfuric acid.

Recently, the Environmental Protection Agency has concluded that catalytic exhaust converters to be widely utilized on future motor vehicles inherently treat automotive exhaust emissions in such a manner as to result in a significant vaporous or aerosol form sulfuric acid efflux. Accordingly, it has become all-important to provide a simple, accurate and economic method and apparatus for the quantitative analysis of gases containing sulfuric acid in vapor or aerosol form. In accordance with the present invention, these desirable goals have been substantially completely achieved.

OBJECTS OF THE INVENTION

It is a principal object of the present invention to provide a novel method for the quantitative analysis of sulfuric acid vapor or aerosol entrained in a gaseous medium.

It is another object of the present invention to provide an improved method for the quantitative analysis of sulfuric acid vapor or aerosol contained as a pollutant in ambient air.

It is another object of the present invention to provide novel apparatus for the quantitative analysis of sulfuric acid vapor or aerosol entrained in a gaseous medium.

It is another object of the present invention to provide apparatus for the collection and quantitative analysis, by electrical conductance measurement, of sulfuric acid vapor or aerosol entrained in a gaseous medium.

It is still another object of the present invention to provide apparatus for the collection and quantitative analysis, by electrical conductance measurement, of sulfuric acid vapor or aerosol contained as a pollutant in ambient air.

Other objects and advantages of the present invention will in part be obvious and will in part appear hereinafter.

SUMMARY OF THE INVENTION

In accordance with the present invention, sulfuric acid in vapor or aerosol form and entrained in a carrier gas stream is collected by contacting said stream with a volume of extractant water having a substantial exposed surface. The resulting sulfuric acid/water solution and enclosure is then diluted and washed with a known quantity of water to provide a collected sulfuric acid-containing liquid aliquot of known volume. The electrical conductivity of said aliquot is then determined and, compensatorily taking into account the effect on conductivity of the temperature of the aliquot, the measured conductivity is related to the quantity of sulfuric acid present in the aliquot.

The apparatus of the invention comprises an enclosure containing therein means to expose a substantial surface of a volume of water to a sulfuric acid-containing carrier gas stream and means to inject selected quantities of water thereinto. Communicating with said enclosure is a separate enclosure defining a conductance measuring chamber and comprising a conductance cell and temperature sensing means.

THE DRAWINGS

DESCRIPTION OF PREFERRED EMBODIMENTS

As mentioned, the first step in the general outline of the method of the present invention resides in contacting of the carrier gas stream, containing the sulfuric acid unknown entrained therein as an aerosol or vapor, with a known volume of extractant water of substantial exposed surface. Generally, any technique for substantially increasing the exposed surface of a volume of water is suitable for use in preparing the water extractant for contact with the sample-containing gas stream. Accordingly, in this regard the water extractant can be rendered into the vapor or steam phase prior to contact with the carrier gas; the sample gas can be injected into a standing volume of water through one or more bubbling or sparging devices; the water can be treated by frothing thereof, with or without the aid of non-ionic surfactants; the apparatus enclosure can be equipped with physical means, such as a high speed spinning disk or stirrer, for comminution of the extractant water into a fine aerosol or fog and the like. However, we have found that sulfuric acid, in vapor form, tends to self-nucleate upon condensation thereof from a carrier gas, thereby resulting in a sulfuric acid mist. Therefore, we much prefer, in the interests of avoiding contact and extraction difficulties and inefficiencies as well as for purposes of simplicity and economy, that the increase in exposed surface of the extractant water be achieved through the employment of a porous inert filter element moistened with the extractant water. Further details concerning the use, function and structural details of such filter elements as they relate to the practice of the invention appear hereinafter.

Figure 1:
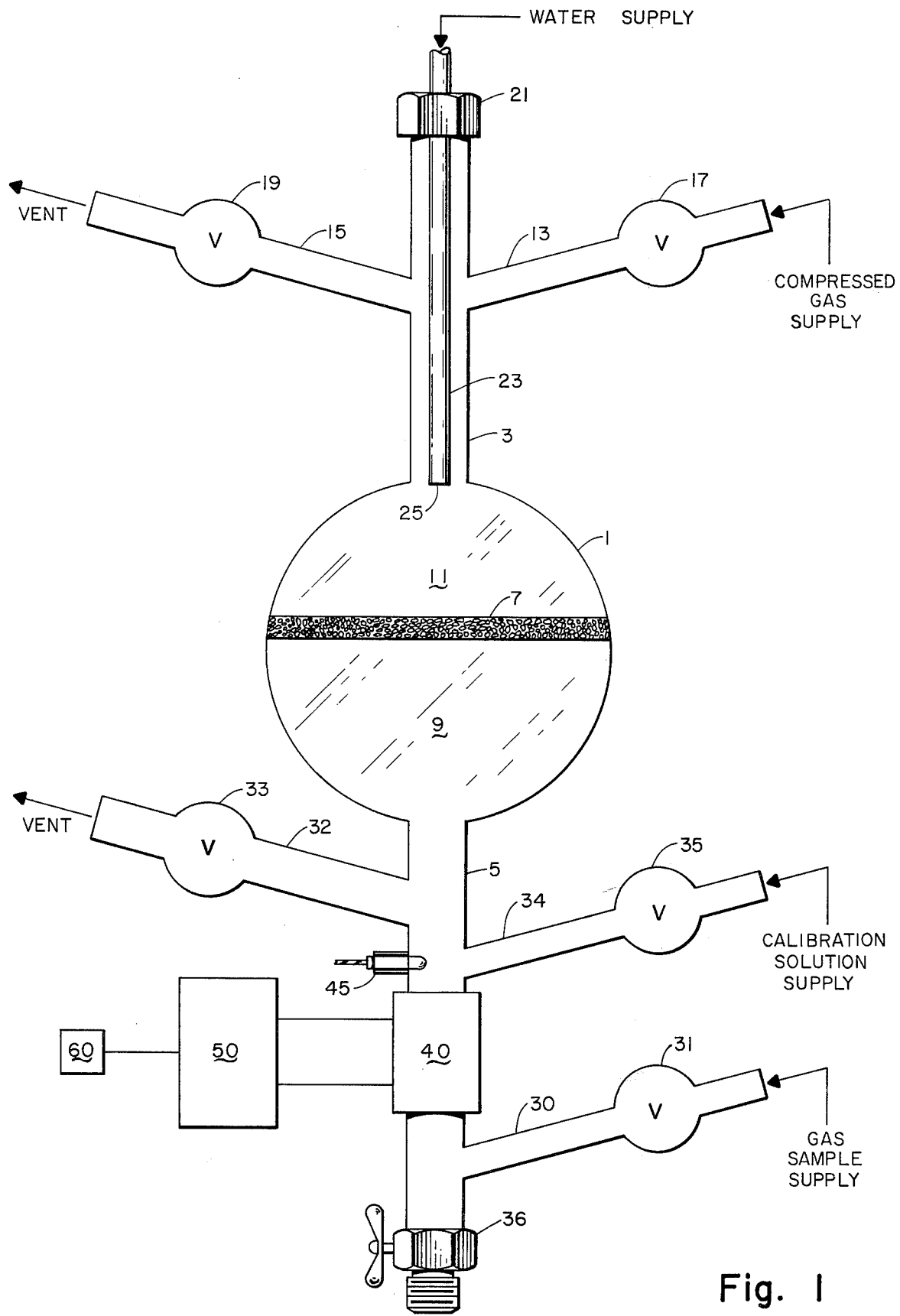
FIG. 1 is a schematic, diagrammatic side view of a preferred embodiment of the sulfuric acid collection and analyzing apparatus of the invention.
Figure 2:
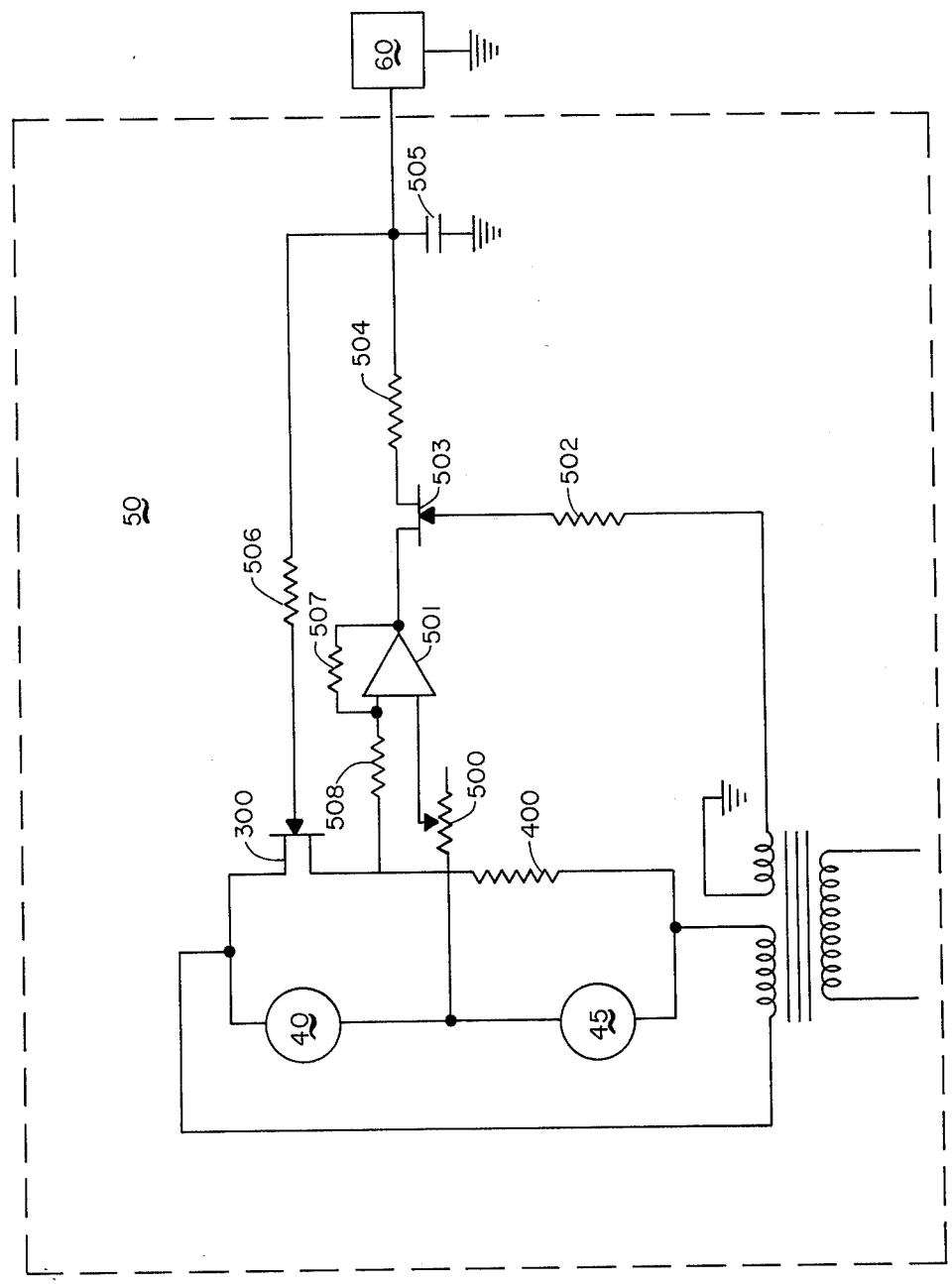
FIG. 2 is an electronics schematic disclosing another preferred embodiment of the apparatus of the invention.

Turning now to FIGS. 1 and 2, wherein like reference numerals refer to like structure, a preferred embodiment of the sulfuric acid collection and analyzing apparatus of the invention comprises a general enclosure 1 having in communication with the interior thereof and integrally associated therewith an upspout 3 and downspout 5. A porous water-wettable filter element 7 partitions enclosure 1 into a lower collection chamber 9 and upper washing chamber 11. Said element 7 can be composed of substantially any substantially inert, water-wettable substance such as, for instance, stainless steel, various ceramics, glass or various of the synthetic polymers. However, for reasons of structural simplicity and economy as well as for its inherent requisite properties of wettability and inertness, we generally prefer porous filter element 7 to be composed of glass and further prefer that said element take the physical form of a sintered glass frit as opposed to, say, the form of a mat composed of unbound glass fibers.

It is, of course, a principal purpose of filter element 7 to provide exposure of a substantial surface of the extractant water volume to the sample gas stream as it is flowed through the filter element. Further, however, it is also the purpose of porous element 7 to divide the sample gas stream into a multiplicity of small streams, said small streams being directed through tortuous paths and being repetitively re-mixed and re-divided as they flow in contact with the extractant water contained in the element. The combination of the features inherent in the employment of a porous filter element 7 in the manner disclosed results in the achievement of an efficient and substantially complete extraction of the sulfuric acid from the sample gas flowing through the filter element.

Extending from upspout 3 are sidearms 13 and 15, equipped with valves 17 and 19, respectively. Sidearms 13 communicates with a low pressure compressed gas source (not shown) while sidearm 15 defines a venting conduit. Valves 17 and 19, of course, are operable so as to confer the ability to build, maintain or release pressure from the system. The upper end of upspout 3 is equipped with gland nut 21, adapted to form a sealing engagement with said upspout 3 and to position tubular element 23 coaxially within upspout 3 and with the terminus 25 thereof maintained at about the juncture of enclosure 1 and upspout 3. Said tubular element 23 defines a water injection probe through which extractant water for moistening of filter element 7 and wash water for backwashing of the element 7 and for flushing of the apparatus is injected into chamber 11. Thus, said tubular element communicates with a water supply means, not shown, adapted to supply accurately measured volumes of water to chamber 11. Said water supply means can take the form of a hypodermic syringe or, more conveniently, an automatic pipette or a calibrated pump device known in the art.

Downspout 5 is equipped with a sample inlet sidearm 30, venting sidearm 32 and, preferably, a calibration solution inlet sidearm 34. Said sidearms are also equipped with suitable valves 31, 33 and 35, respectively, whose particular functions will be described in more detail with reference to the description of an actual analysis cycle appearing hereinafter. The bottom of downspout 5 is equipped with a spigot 36 whose function it is to provide for discharge of the liquid contents of the apparatus. Completing the structure associated with downspout 5 are conductance cell 40 and a temperature measuring means 45 which are desirably located as close to one another as is practicable. Conductance cell 40 communicates through suitable electronic circuitry 50 so as to present its conductance output signal at a suitable transducer 60, such as a voltmeter. While the temperature measuring means 45 can take the form of a simple thermometer it should be noted that the electrical conductance of a sample solution is, in part, a function of the temperature thereof. Accordingly, where no suitable intercommunication between the conductance cell 40 and temperature measuring apparatus 45 is achieved, it will be necessary for the operator of the device to first determine the conductance sensed by the conductance cell 40 and displayed by transducer 60 and then apply thereto a correction for the measured temperature of the sample liquid. This can be readily and advantageously avoided, however, when the temperature measuring means 45 takes the form of a thermistor and when the output signals from the thermistor and conductance cell 40 are fed to a self-nulling Wheatstone bridge arrangement such as shown in FIG. 2. Referring now specifically to FIG. 2, those skilled in the art will recognize that thermistor 45 and conductance cell 40 form two of the resistive elements of a Wheatstone bridge arrangement while elements 300 and 400 form the remaining two elements. The variable self-nulling circuitry, identified by the combination of elements 500 through 508, provides an automatic balancing circuit for the Wheatstone bridge arrangement, the voltage required for said balancing or nulling of the bridge being transmitted as the primary signal to transducer 60. Employing this preferred self-nulling Wheatstone bridge arrangement in which the conductance cell 40 and temperature measuring means 45 are integral elements, there is provided the ability to automatically compensate the liquid conductivity sensed by cell 40 for the temperature of the sample liquid and thus further provide the capability for the direct presentation of fully temperature compensated conductivity or sulfuric acid concentration by transducer 60. Further, where the volume of original sample gas from which the sulfuric acid is collected is known, the conductance data depicted by transducer 60 can be related in terms of the concentration of sulfuric acid per unit volume and/or mass of the original sample gas.

There follows a description of a typical operating cycle in the practice of the method of the invention employing the apparatus described hereinabove and comprising the self-nulling Wheatstone bridge arrangement of FIG. 2. The overall enclosing apparatus of FIG. 1 is formed of glass and comprises the following specific structural elements:

Filter element 7 — a Pyrex glass wafer frit having an average pore dimension of 10 $\mu$, identified by the manufacturer, Corning Glass Works, Corning, N.Y., as Gas Filtering Tube 39580 M.

Temperature measuring means 45 — a precision polytetrafluoroethylene coated thermistor manufactured by Y.S.I. Company, Yellow Springs, Ohio, and identified as Part No. 44108.

Conductance cell 40 — Beckman Model CEL-DO1, manufactured by Beckman Instruments, Inc., Fullerton, Calif.

Transducer 60 — digital voltmeter, Model 2510-1 B-1, Analogic, Inc., Wakefield, Mass.

Valves 17, 19, 31, 33, 35 and spigot 36, solenoid operated, slaved to timed operations, ASCO Automatic Switch Co., Florham Park, N.J.

Calibration solution supply and water supply means — Masterflex pump, manufactured by Barnant Corp., Barrington, Ill., slaved to timed operations.

Spigot 36 and valves 31 and 17 are closed. A calibrated solution, comprising dilute aqueous sulfuric acid of known concentration, is admitted into downspout 5 through valves 35 and sidearm 34, the volume of said solution admitted being sufficient to bring the level thereof to at least the temperature measuring means 45. Valve 35 is closed and the conductance of the calibration solution residing in downspout 5 determined through the operation of cell 40. The data presented by transducer 60 is checked against a calibration curve developed for the apparatus by prior determinations and plotting of the conductivities of a plurality of calibration solutions comprising a range of sulfuric acid concentrations of interest. Next, the calibration solution is flushed from the system by opening spigot 36 and, if desired, by injecting small quantities of deionized wash water through tubular element 25 while slightly pressurizing the system by opening valve 17 serving sidearm 13. The water flows through porous element 7, flushes down the sides of downspout 5 and is discharged from the apparatus through spigot 36. Spigot 36 and valve 17 are closed while valve 15 is opened, thereby depressurizing the system. A small but known amount of extractant water, ca. 0.2cc, is introduced into chamber 11 through tubular element 23 so as to thoroughly moisten filter element 7 and to provide a thin layer of water above the surface thereof. Valve 31 is opened and the sample gas, containing entrained therein sulfuric acid vapor or aerosol, flows through sidearm 30 into downspout 5 and thence upwardly into collection chamber 9. By virtue of the fact that valve 19 is maintained open, the sample gas percolates through moistened filter 7, thereby to extract the sulfuric acid component.

The physical form of the sulfuric acid in the sample gas admitted through sidearm 30 can be as an aerosol or as a vapor. It is much preferred that potentially interfering ionizable components of the sample gas, if present, be removed prior to admission thereof into the apparatus of the invention. A particularly suitable method and apparatus for accomplishing both removal of potentially interfering ionizable components of an original sample gas while rendering the sulfuric acid component thereof into vapor form is disclosed in co-owned U.S. Pat. application Ser. No. 354,929, Richards et al., filed Apr. 27, 1973, issued as U.S. Pat. No. 3,838,972. Therein there is disclosed a method for collection of sulfuric acid aerosol from entrainment in a sample gas by filtration thereof through a porous filter medium held at a first collection station. The sullied filter medium containing its collected burden of sulfuric acid and other particulate matter is then moved to a desorption station wherein the sulfuric acid is vaporized by flowing a dry and preferably moderately heated inert purge gas through the filter medium. By this method of collection and desorption, the sample gas stream resulting from the volatilization of the collected sulfuric acid is freed of many of various ionizable components which could ordinarily interfere with quantitative analysis of the stream for sulfuric acid such as, for instance, sulfur dioxide, hydrogen sulfide, nitrogen dioxide, HCl, ammonium sulphate, cuprous sulfate and the like. Such materials often form part of an originally sampled air mass, particularly where the sample is taken from a relatively polluted environment. Accordingly, the method and means described in the above-cited reference for collection of sulfuric acid aerosol from a sample gas stream by filtration and the subsequent volatilization of the collected sulfuric acid by flowing a dry inert gas stream through the filtration element constitutes a preferred embodiment for use in combination with the present invention. It will be recognized, of course, that when the above-described preliminary filtration and desorption of the sample gas stream is effectuated, the composition of the ultimate sample or carrier gas entering through sidearm 30 will generally consist essentially of the volatilized sulfuric acid entrained in a dry inert gas. Accordingly, employing the preferred embodiment outlined above, the composition of the carrier gas stream entering sidearm 30 will normally be significantly different from the composition of the original sample gas. Thus, that portion of the above-cited U.S. Pat. No. 3,838,972 relating to method and means for filtration of a sulfuric acid aerosol-containing gas sample and the subsequent volatilization of the sulfuric acid collected on the filter medium by contact thereof with a dry inert gas stream is specifically intended to be incorporated herein by reference thereto.

Having thus completed the collection phase of the cycle, valve 31 is closed to arrest the flow of sample gas into downspout 5. the filter element is then backwashed with a known quantity of deionized wash water, spigot 36 being maintained in the closed condition. Said backwashing is accomplished by introducing a measured quantity (ca. 4 cc) of deionized wash water into wash chamber 11 through tubular element 21, opening lower vent valve 33 and pressurizing the washing chamber 11 by closing valve 19 with valve 17 remaining open. The resulting pressure build-up behind the head of water in chamber 11 thus serves to aid in forcing the wash water back through filter element 7 into downspout 5. If desired, the backwashing of the filter element 7 can take place in a number of repeated cycles. It should also be noted that the total quantity of water employed for both the preliminary moistening of the filter element 7 and for the backwashing thereof should be sufficient to provide a fill of downspout 5 to a level of at least that of temperature measuring means 45 and preferably to a level at least slightly thereabove. The liquid aliquot also enters the region of sidearm 30 which can contain some additional condensed sulfuric acid. This acid-rich solution, if present, can be purged from the sidearm 30 by injection of an inert gas through sidearm 30 into downspout 5, thereby thoroughly mixing the solution residing in sidearm 30 with the remainder of the liquid aliquot such that a liquid aliquot of uniform acid concentration results in the conductance measuring chamber.

The liquid aliquot thus being received in downspout 5 is then subjected to determination of the electrical conductivity and temperature thereof. Where, as in the preferred embodiment wherein the signals from temperature measuring means 45 is a thermistor and wherein the signals from the conductance cell 40 and thermistor 45 are fed to a self-nulling Wheatstone bridge as depicted in FIG. 2, the conductance data presented by the transducer 60 will be automatically compensated for the temperature of the sample aliquot and will, therefore, normally be in a condition for direct presentation of the concentration of sulfuric acid contained therein.

While this invention has been described above with respect to certain embodiments thereof, it is not so limited, and it should be understood that variations and modification thereof may be made which are obvious to those skilled in the art without departing from the spirit and scope of the invention.

What is claimed is:

1. A method for the quantitative analysis of sulfuric acid contained as an aerosol or vapor in a carrier gas which comprises:
   A. providing an enclosed collection zone having an outlet comprising a gas permeable, porous, water wettable and inert filter medium;
   B. wetting said filter medium with a small known quantity of liquid water extractant to provide said water extractant entrained in liquid form in the filter medium and having a substantially exposed surface;
   C. introducing said carrier gas into said enclosed collection zone to cause contact thereof with said wetted porous filter medium;
   D. backwashing said filter medium from the downstream side thereof with an additional known quantity of water extractant to provide a volume of sulfuric acid-containing aqueous aliquot; and
   E. determining the electrical conductivity and temperature of said aliquot.

2. The method of claim 1 wherein the original sample gas is ambient air comprising sulfuric acid in aerosol form and wherein said sample gas is pretreated by, seriatim, flowing thereof through a porous filter medium adapted to separate said sulfuric acid aerosol and other particulate matter therefrom and flowing a dry inert gas stream through said sulfuric acid laden filter medium to produce said carrier gas containing said sulfuric acid in vapor form.

3. The method of claim 1 wherein said determinations of temperature and conductivity provide electrical signals which are integrated so as to temperature compensate the conductivity of the aliquot.

4. The method of claim 1 wherein said backwashing of the filter medium is accomplished in a plurality of serial, separate and distinct steps.

5. Apparatus for the quantitative analysis of sulfuric acid contained as an aerosol or vapor in a carrier gas which comprises:
   A. an enclosure having an outlet comprising a gas permeable, porous, water wettable and inert filter element, means to deliver a known small quantity of liquid water extractant sufficient to wet said filter element, means to deliver an additional known quantity of backwashing water extractant to the downstream side of said filter element and means to deliver a sulfuric acid-containing carrier gas into said enclosure;
   B. a conductivity measuring chamber adapted to receive a volume of liquid aliquot from said enclosure of (A) and comprising an electrical conductivity cell and temperature sensing means.

6. The apparatus of claim 5 wherein said filter element is a glass frit.

7. The apparatus of claim 5 wherein said enclosure of (A) is disposed substantially vertically, said filter element is disposed across the interior of said enclosure to define an upper filter washing chamber and a lower collection chamber and wherein each of said means to deliver water extractant is disposed to discharge said water extractant into said upper chamber.

8. The apparatus of claim 7 wherein said upper washing chamber is additionally equipped with inert gas pressurizing means and said lower collection chamber is equipped with pressure relieving means, said pressurizing and relieving means coacting to aid in the flow of water extractant from said washing chamber through said porous filter element and into said collection chamber.

9. The apparatus of claim 5 wherein said temperature sensing means is a thermistor, wherein said thermistor and said conductivity cell form two variable resistor elements in a Wheatstone bridge arrangement and wherein the voltage required to null said Wheatstone bridge arrangement is employed as the output signal to a transducer, said transducer thereby displaying the temperature compensated conductivity of a volume of liquid contained in said chamber of (B).

* * * * *